United States Patent
Leinfelder

(10) Patent No.: US 8,948,957 B2
(45) Date of Patent: Feb. 3, 2015

(54) METHOD AND SYSTEM FOR OPERATING A VEHICLE BY MONITORING THE MOVEMENT OF THE VEHICLE BY MEANS OF A CAMERA DEVICE OF A MOBILE CONTROL DEVICE

(71) Applicant: Audi AG, Ingolstadt (DE)

(72) Inventor: Rudolf Leinfelder, Eichstätt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/974,824

(22) Filed: Aug. 23, 2013

(65) Prior Publication Data
US 2014/0058613 A1   Feb. 27, 2014

(30) Foreign Application Priority Data

Aug. 25, 2012 (DE) .......................... 10 2012 016 868

(51) Int. Cl.
| | |
|---|---|
| *G05D 1/00* | (2006.01) |
| *G05D 1/02* | (2006.01) |
| *B60W 30/06* | (2006.01) |
| *B62D 15/02* | (2006.01) |
| *B60W 30/00* | (2006.01) |

(52) U.S. Cl.
CPC ............ *G05D 1/0231* (2013.01); *B60W 30/06* (2013.01); *B62D 15/0285* (2013.01); *B62D 15/028* (2013.01); *B60W 30/00* (2013.01)
USPC .......................................... 701/28; 348/114

(58) Field of Classification Search
None
See application file for complete search history.

(56) References Cited

U.S. PATENT DOCUMENTS

| | | | | |
|---|---|---|---|---|
| 8,635,015 | B2 * | 1/2014 | Anderson | ...................... 701/400 |
| 2003/0004613 | A1 | 1/2003 | Hahn et al. | |
| 2008/0082208 | A1 * | 4/2008 | Hong et al. | ................... 700/245 |
| 2010/0329513 | A1 | 12/2010 | Klefenz | |
| 2013/0169792 | A1 | 7/2013 | Mathes et al. | |
| 2013/0265426 | A1 * | 10/2013 | Fan et al. | ...................... 348/148 |

FOREIGN PATENT DOCUMENTS

| | | |
|---|---|---|
| DE | 10 2006 062 061 A1 | 7/2008 |
| DE | 10 2009 041 587 A1 | 3/2011 |
| DE | 10 2009 051 463 A1 | 5/2011 |

(Continued)

OTHER PUBLICATIONS

E. Altug et al., "Control of a Quadrotor Helicopter Using Visual Feedback", May 2002, Proceedings of the 2002 IEEE International Conference on Robotics and Automation, pp. 72-77.*

*Primary Examiner* — John R Olszewski
*Assistant Examiner* — David Merlino
(74) *Attorney, Agent, or Firm* — Henry M. Feiereisen LLC

(57) ABSTRACT

In a method for operating a vehicle which performs an autonomously controlled movement, images of the vehicle are recorded in temporal succession with a mobile control which is held by an operator located outside the vehicle, a position of the vehicle in the images, a change of the position of the vehicle in the images, a proportion of the depiction of the vehicle of the total image content and/or a change of the proportion is analyzed by an analysis device, and in case the vehicle was not or only incompletely detected in the images, the proportion of the depiction of the vehicle of the total image content, the change and or degree of change of the proportion is above or below a predeterminable threshold value, the autonomously controlled movement of the vehicle ins interrupted or terminated.

10 Claims, 1 Drawing Sheet

(56) References Cited

FOREIGN PATENT DOCUMENTS

| DE | 10 2010 034 139 A1 | 2/2012 |
|----|---------------------|--------|
| EP | 1 249 379 A2 | 10/2002 |
| EP | 2 184 208 | 5/2010 |
| EP | 2 316 709 | 5/2011 |
| JP | 2006-69443 | 3/2006 |

* cited by examiner

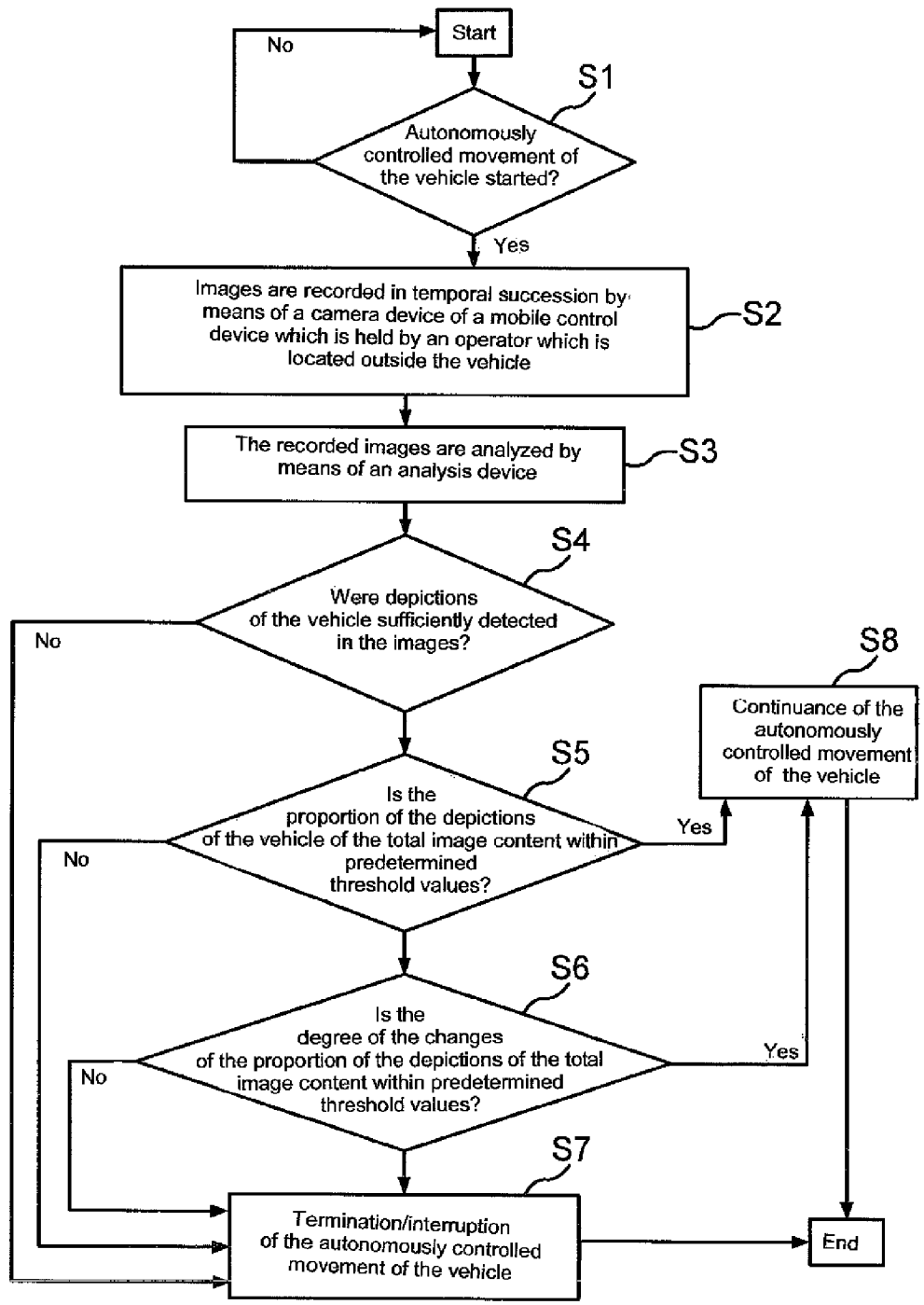

METHOD AND SYSTEM FOR OPERATING A VEHICLE BY MONITORING THE MOVEMENT OF THE VEHICLE BY MEANS OF A CAMERA DEVICE OF A MOBILE CONTROL DEVICE

CROSS-REFERENCES TO RELATED APPLICATIONS

This application claims the priority of German Patent Application, Serial No. 10 2012 016 868.3, filed Aug. 25, 2012, pursuant to 35 U.S.C. 119(a)-(d), the disclosure of which is incorporated herein by reference.

BACKGROUND OF THE INVENTION

The present invention relates to a method and system for operating a vehicle by monitoring the movement of the vehicle by means of a camera device of a mobile control device.

The following discussion of related art is provided to assist the reader in understanding the advantages of the invention, and is not to be construed as an admission that this related art is prior art to this invention.

In the past years many efforts were undertaken and technical solutions have become known with which a vehicle, in particular a motor vehicle can be controlled autonomously.

In an autonomous control of a vehicle, which oftentimes is also referred to as "piloted driving", the vehicle is moved predominantly by means of sensors and actuators (also referred to as actuating system) of the vehicle without a driver directly controlling the vehicle.

An example for piloted driving are parking-steering-assist systems, which enable an automatic parking and unparking of a vehicle.

For example, EP 1 249 379A2 describes a method for maneuvering a motor vehicle into a target position, wherein the motor vehicle is brought into a starting position close to the desired target position, the environment of the motor vehicle is traced after a first activation by the driver, which tracing is continuous at least for detecting the target position, and the actual position of the vehicle is continuously determined, items of control information for maneuvering the motor vehicle into the target position are determined by means of the determined environmental and positional information, after a second activation by the driver, control commands which depend on the control information are outputted to the drive train and/or the braking system and/or the steering of the motor vehicle, thereby causing the motor vehicle to drive into the target position independent of the driver.

DE 10 2009 051 463 A1 discloses a vehicle with associated external control device and a parking-steering-assist system including a control device situated in the motor vehicle is known, wherein the external control device is configured for communication with the control device of the motor vehicle, and the control device of the motor vehicle is configured for determining a positional information regarding the location of the driver and/or a target position set by the driver by taking the signals that have been transmitted during the communication into account, wherein an unparking procedure which is controlled by the control device of the motor vehicle can be carried out by taking the positional information to account.

Such autonomous or piloted driving processes of a (motor) vehicle require that the driver always has to be able to intervene in the process in particular to terminate the process. Thus, the already mentioned EP 1 249 379A1 describes that an automatic parking and ranging process can be started and interrupted by means of a transmission device. The automatic parking or ranging process is only maintained so long as the driver maintains contact with the vehicle for example by pressing a parking or ranging button on the transmission device. When the button is released the parking and ranging process is immediately interrupted and the vehicle is automatically stopped. The transmission device can for example be integrated in the ignition key or in a mobile phone.

Further, a driver assist device for a motor vehicle with a control device is known from DE 10 2009 041 587 A1 which is configured to output control signals to the drive and/or steering device of the motor vehicle which cause an automatic execution of the parking process, and to receive commands from a remote control and after receiving a pre-determined interruption command, to interrupt an already initiated parking process of the motor vehicle, wherein at least one camera which is coupled with the control device is provided for obtaining image data relating to a vicinity of the motor vehicle, wherein the control device is configured to send signals to the remote control which signals include the image data obtained by the camera and/or image data calculated from the signal. The driver is supported by this driver assist device during monitoring an autonomous parking procedure of the motor vehicle in that images relating to a vicinity of the motor vehicle are displayed to the driver on a display device of the portable or mobile remote control. The driver can thus see objects in the vicinity of the motor vehicle and as the case may be terminate the autonomous parking procedure in case of a dangerous situation.

The driver assist device known from DE 10 2000 904-1587 1 is disadvantageous in as far as a driver has to observe a relatively small display device in case of a mobile remote control and has to decide based on the representations displayed on the remote control whether a dangerous situation exists or not. However, due to the relatively small size of the display device, details of the recorded vicinity cannot or can only inaccurately be recognized. This situation is exacerbated in case of bright ambient light because in this case the displayed images and items of information are often not or only poorly recognizable.

It would therefore be desirable and advantageous to provide an improved method and system for operating a vehicle.

SUMMARY OF THE INVENTION

According to one aspect of the present invention, a method for operating a vehicle includes detecting images in temporal succession with a mobile control device held by an operator located outside the vehicle; determining with an analysis device at least one of a position of the vehicle in the detected images, a change of the position of the vehicle in the detected images, a proportion of the depiction of the vehicle of the total image content and a change of the proportion of the depiction of the vehicle of the total image content; and interrupting or terminating the autonomously controlled movement of the vehicle in response to at least one of a depiction of the vehicle not being detected or not completely being detected by the images, the proportion of the depiction of the vehicle of the total image content lies above or below a predeterminable threshold value, the change of the position of the vehicle in the images lies above or below a predeterminable threshold value and a degree of the change of the proportion of the depiction of the vehicle of the total image content lies above or below a predeterminable threshold value.

During the autonomous or piloted movement of the vehicle thus on one hand the respective actual distance and movement of the vehicle relative to the operator is detected or analyzed, which operator holds the mobile control device and records images of the vehicle in temporal sequence with the control device. In predeterminable situations for example when it is determined that the operator is located or moves too far away from the vehicle (proportion of the depictions of the vehicle of the entire image content is too small or falls below a predeterminable threshold value), is located to close to the vehicle or the distance between the vehicle and the operator falls below a predeterminable threshold value (proportion of the imaging of the vehicle of the entire image content is too large or exceeds a predeterminable threshold value), the operator is unable to sufficiently follow the movement of the vehicle or holds the mobile control device in the wrong way (the vehicle this not or not completely detected by the images) the autonomous or piloted movement of the (motor) vehicle is automatically interrupted or terminated without necessitating an active intervention of the operator.

Compared to the state-of-the-art the method according to the invention has the advantage that an operator (which often is the driver of the vehicle), who is located outside the vehicle during the autonomous or piloted movement of the vehicle, has to detect the vehicle and its movement with a camera device of a mobile control unit. When the images that have been detected by the vehicle do not correspond to defined predeterminable criteria, this movement is automatically interrupted or terminated.

For an even more accurate adjustment between the distance of the vehicle from the mobile control device and/or the relative movement between the mobile control device and the vehicle is provided according to a first advantageous refinement of the invention that data are transmitted which relate to an actual position or data relating to a starting position, a speed and/or a speed profile and a direction and/or a directional profile are transmitted to the analysis device.

According to a second advantageous refinement of the invention, a smartphone is used for the method as mobile control device. Practically any modern mobile phones (which currently are usually referred to as smartphone) include at least one camera device. With this it is possible to detect images in a temporal succession in which images the autonomously controlled vehicle is displayed.

According to a further advantageous refinement of the invention a digital calculating device is used as the analysis device in the mobile control device and/or in the vehicle. For example, modern smartphones are already to date equipped with powerful processors with up to four cores for processing a large number of calculations per second. Likewise, powerful processors or calculation devices are used in (motor) vehicles for diverse calculation tasks. This available processing power, which is expected to further increase in the coming years, can be advantageously used for the method according to the invention.

According to another advantageous feature of the invention, data can be transmitted between the vehicle and the mobile control device by means of a wireless radio connection by using a radio standard according to IEEE-802.11a, IEEE-802.11b, IEEE-802.11g, IEEE-802.11n, IEEE-802.15.1, IEEE-802.15.2, IEEE-802.15.3, IEEE-802.15.4, a modification and/or further development thereof or a mobile radio standard. By means of these radio standards—which are implemented in many (motor) vehicles and mobile control devices such as smartphones—the wireless data exchange can be realized in a cost-effective and at the same time reliable manner.

According to another advantageous feature of the invention, for starting the autonomously controlled movement of the vehicle, a signal is sent to the vehicle by the operator which is located outside the vehicle by means of a handheld transmitter and/or the mobile control device. The same applies when a signal can be sent wirelessly to the vehicle by the operator who is located outside the vehicle by means of a handheld transmitter and/or the mobile control device for interrupting or terminating the autonomously controlled movement of the vehicle.

The method according to the invention is not limited to a particular type of the autonomously controlled movement of the vehicle it can however in particular be used for an autonomous parking procedure an autonomous unparking procedure and/or an autonomous continuance of the drive. It is further advantageous when according to a further advantageous refinement of the invention the images which are recorded by the camera device of the mobile control device in temporal succession are displayed in real-time on a display device of the control device.

According to another aspect of the present invention, a system for operating a vehicle, includes a vehicle and a mobile control device which are configured for implementing the method according to the invention or one of its advantageous refinements.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIGURE shows a schematic diagram of an example for the sequence of steps of the method according to the invention.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

In the flow diagram shown in the FIGURE, which represents a preferred exemplary embodiment of the present invention, it is checked in the first step S1 whether an autonomously controlled movement of a vehicle was started. This can for example occur by reading out the state of a control device, which is provided for an autonomously controlled movement of a vehicle, or by detecting a corresponding control command.

When this check or query shows that an autonomously controlled movement of the vehicle was started, images are recorded in temporal succession by means of a camera device of a mobile control unit, which is held by an operator who is located outside the vehicle.

According to step S3, the recorded images are analyzed by means of an analysis device. Here it can be checked or analyzed in a step S4 whether depictions of the vehicle are sufficiently detected in the recorded images. The meaning of the term "sufficiently" can be predefined in any desired manner. For example it can be provided as a threshold value that essentially one side of the vehicle has to be recognized in its entirety in the images, or that the vehicle can be identified with a predetermined degree of probability in the images as the vehicle to be observed (for example by way of color, shape). Other criteria can also be used such as brightness and/or contrast of the depictions in the images.

When the testing or the analysis in step S4 yields a negative result, for example because the vehicle to be observed cannot be recognized in the recorded images because the user holds the control device in a manner in which the vehicle cannot be detected from the detection range of the camera device, the autonomously controlled movement of the vehicle is terminated or interrupted in a step S7. A term such as "terminated" as used in the present application can also mean that the autonomously controlled movement of the vehicle does not start in the first place, the "termination" thus for example occurs immediately after the start signal for the autonomously controlled movement.

When the check or analysis in step S4 yields a positive result i.e., depictions of the vehicle are detected sufficiently in the detected images, the testing or analysis is carried out in step S5 whether the proportion of the depictions of the vehicle of the total image content lie within predetermined threshold values.

This testing or analysis serves for determining at which distance the mobile control unit is located from the vehicle. The recording angle of the optic that is used in the camera device is known or can be read out. The recording angle results for example from the focal length of the used optic and the light-sensitive recording surface that is used for detecting the images (chip size). Likewise it is known or can be read out whether and if yes which optical or digital zoom factor was used.

Based on these recording parameters in combination with the analysis for determination of the size of the depictions of the vehicle or the detected proportion of the vehicle in the detected images it can be determined or estimated how far away from the vehicle to be observed the control device is located.

When it is determined that the vehicle is located too close to the vehicle, i.e., the proportion of the depictions of the vehicle of the total image content is more than a predetermined threshold value, it can be concluded that the operator does not have a sufficient overview over the overall situation or that depending on the direction of movement of the vehicle there may even be the risk of a collision between the operator and the vehicle. Therefore, in this case the autonomously controlled movement of the vehicle is terminated or interrupted in step S7.

When on the other hand the proportion of the depictions of the vehicle of the total image content is smaller than a predetermined threshold value this means that the operator is located at a distance from the vehicle where he is no longer capable to sufficiently observe the autonomously controlled movement of the vehicle i.e., he is also no longer capable to recognize the formation or existence of a dangerous situation with sufficient accuracy. Therefore, the autonomously controlled movement of the vehicle is also stopped in this case in step S7.

When the test or analysis in step S5 shows that the proportion of the depictions of the vehicle of the total image content of the detected images lie within the predetermined pressure values, it is tested in a step S6, whether the degree of change of the proportion of the depictions of the total image content lie within predetermined threshold values.

For example defined threshold values for a maximum speed are predetermined in a parking or unparking process which is detected by the camera device of the mobile control device. Therefore, the depictions of the vehicle in the detected images will change in an expected manner. In case of a movement in the direction toward the mobile control device, the proportion of the depictions of the vehicle of the detected images will increase and correspondingly will decrease in case of a movement away from the mobile control device.

If for example in step S6 it is determined that the degree of the change lies outside predetermined threshold values i.e., the motor vehicle moves too slowly or too fast, a malfunction can be concluded (for example the vehicle is decelerated by an obstacle or a malfunction of the controlled system for the autonomous movement exists). Therefore, the autonomously controlled movement of the vehicle is also terminated or interrupted in this case in step S7.

In the exemplary embodiment shown in the FIGURE, the steps S4, S5 and S6 occur successively. Such a sequence however is not strictly required for the method according to the invention. For example the mentioned steps can also be carried out in parallel or quasi parallel (i.e., in shortest possible temporal distances to each other). As far as a state is recognized in one of these steps which according to the predetermined criteria and/or threshold values requires a termination or interruption of the autonomously controlled movement of the vehicle, the method jumps to step S7 and the autonomously controlled movement of the vehicle is terminated or interrupted.

For example it may be that initially for all steps S4, S5 and S6 the criteria for continuing the autonomously controlled movement of the vehicle are satisfied. When the operator now changes the orientation of the mobile control device in a manner so that depictions of the vehicle can no longer be sufficiently detected in the detected images, step S7 is initiated according to step S4 and the autonomously controlled movement of the vehicle is terminated or interrupted. Or when the operator moves too close to the vehicle during the autonomously controlled movement of the vehicle or moves too far away from the vehicle, the autonomously controlled movement of the vehicle is terminated or interrupted in connection with step S7 according to the steps S5 and/or S6.

For an even more accurate correlation between the distance of the vehicle to the mobile control device and/or the relative movement between the mobile control device and the vehicle, data relating to a respective actual position of the vehicle or data relating to a starting position at the beginning of the method (these data can for example be determined by means of GPS) and a detection of the speed and/or a speed profile and the direction and/or an directional profile (steering angle, steering behavior) of the vehicle can be transmitted to the analysis device or provided to the analysis device. These data can for example be provided by a corresponding device of the vehicle in the vehicle.

In the method according to the invention it is regularly required that data are transmitted from the vehicle to the mobile control device or from the mobile control device to the vehicle, data are exchanged between the mobile control device or data are transmitted from the vehicle and/or the mobile control device to an analysis device.

Thus, for example control commands relating to a continuance and/or relating to a termination or an interruption of the autonomously controlled movement of the vehicle can be transmitted from the mobile control device to a corresponding vehicle-side control device. Or data relating to an actual position of the vehicle can be transmitted from the vehicle to an analysis device, which is provided in the mobile control device.

Here it is preferred that the data are transmitted by means of a wireless radio connection. Suited examples are the radio standards according to IEEE-802.11a, IEEE-802.11b, IEEE-802.11g, IEEE-802.11n (also referred to as wireless Lan-, WLAN- or Wi-Fi standards), IEEE-80215.1, IEEE 802.15.2, IEEE-802.15.3, IEEE-802.15.4 (also referred to as wireless personal area network, WPAN or Bluetooth standards), modifications and/or for the developments there off or a mobile radio standard. In particular the third right use standards according to the IEEE-802 family appear currently as particularly suited for a sufficiently fast and reliable wireless communication over the relatively short distances that are given in the context of the method according to the invention.

According to a preferred embodiment of the method according to the invention a smart phone is used as mobile control device. On a side which is opposite the main display, most smart phones have a camera device which is usually intended to serve for recording stationary and/or moving images (photos and/or videos). By means of this camera device images of the vehicle can be recorded in temporal succession.

The images of the vehicle that are recorded by means of the camera device can be analyzed by an appropriate analysis software or an analysis device as described above.

When the operator chooses to detect the vehicle by means of the camera device of the smart phone, a further advantage is that he will usually hold the smart phone as in the case when taking photos and/or recording films. He will thus hold the mobile control device (smartphone) in front of himself at eye-level. This is especially the case when—as provided according to an advantageous refinement of the present invention—the images of the vehicle which are recorded in a temporal sequence are displayed in real-time on the (main) display of the mobile control device. In such an embodiment of the method according to the invention, the detection of the actual position of the vehicle is thus comparable to the situation when recording a video by means of the smart phone. This will also cause the viewing direction and/or head orientation of the operator to regularly point in the direction of the autonomously controlled vehicle so that the operator also looks in the direction of the vehicle and can also easily recognize a dangerous situation himself and as the case may be, according to a further advantageous refinement of the invention, send a signal per radio by means of the handheld transmitter and/or the mobile control device (smartphone) to the vehicle to terminate or interrupt the autonomously controlled movement of the vehicle.

If the images of the vehicle that have been recorded in temporal sequence are displayed on the (main) display of the mobile control device in real-time, the images can be the detected images themselves, however it is also possible that the images are modified for example based on the analysis performed by the analysis device so as to be better recognizable by a human eye, contain stylizing, are limited to the depiction of the vehicle, and/or contain other items of information (for example a marking of possible sites of danger).

There are no particular limitations with regard to the analysis devices that can be used for carrying out the method according to the invention. For example, the images recorded by the camera device can be analyzed in an analysis device of the mobile control device. The data that have been detected in/by a device (vehicle, movement control device) can for example also be transmitted by radio to an analysis device of the other device (mobile control device, vehicle) and analyzed there. As analysis units for example a digital calculation device in the mobile control device and/or in the vehicle can be used, on which a respective appropriate executable computer program code is installed. Of course, pure hardware solutions are also conceivable as analysis devices.

The term temporal succession in the present application includes all appropriate time intervals. Thus, for example recordings of the vehicle can be detected in a time interval of $\frac{1}{30}$ s, $\frac{1}{20}$ s, $\frac{1}{15}$ s, $\frac{1}{5}$ s. According to the invention no particular time interval is required for the respective detection, rather any time interval that is appropriate for a given situation can be used.

As mentioned above, the method according to the invention is not limited to a particular manner of an autonomously controlled movement of the vehicle. In the presently preferred manner, a method according to the invention can however be used for an autonomous parking procedure, an autonomous unparking procedure and/or an autonomous continuance of the drive. Thus, the method according to the invention can for example be used for an autonomously controlled continuance of the drive in the area of agriculture and forest management and in the area of delivery services (post and postal services).

Not shown in the FIGURE but of course within the scope of the invention are further steps that can be carried out for performing the method according to the invention. Thus, for example after termination/interruption of the autonomously controlled movement of the vehicle in step S7, the method may not only be terminated, but also as the case may be can be returned to the starting point after a predetermined period of time and/or after a renewed control action by the operator or as the case may be (if the autonomously controlled movement was only interrupted) to a subsequent step such as step S3 or step S2. The continuance of the autonomously controlled movement of the vehicle in step S7 is normally only carried out until for example it's successful execution or termination is determined by a control device of the vehicle.

It can further be provided in the method according to the invention that information relating to the vehicle to be observed is stored in the mobile control device, items of information relating to the mobile control device are stored in the vehicle to be observed and/or an effective and appropriate communication between the mobile (portable) control device and the vehicle occurs so that it can be ensured that the method according to the invention occurs between the "right" vehicle and the "right" mobile control device.

It can also be provided that the autonomously controlled movement of the vehicle can be terminated or interrupted at any time by the control device of the vehicle for example when the control device of the vehicle detects an obstacle or a malfunction of the sensor system of the vehicle and/or actuating system of the vehicle.

In addition further devices can be used in the mobile control device in the method according to the invention especially when the mobile control device is used in the form of a smartphone. Thus, many modern smartphones for example include a position or acceleration sensor which allow recognizing movements of the mobile control device during the analysis of the detected images and to take these movements into account with regard to steps S4, S5 and/or S6.

In addition, tolerances or time limits can be provided in the method according to the invention within which the autonomously controlled movement of the vehicle is continued even though according to one of the steps S4, S5 or S6 the autonomously controlled movement of the vehicle would be terminated or interrupted. This allows for example that a brief deviation of the direction of detection of the camera device from the actual position of the vehicle does not immediately lead to termination or interruption of the autonomously controlled movement of the vehicle. The tolerances for time limits can be chosen to have different magnitudes depending on the situation.

The present invention also includes a system for operating a vehicle, which is characterized in that it includes a vehicle and a mobile control device, which can be used for carrying out the method according to the invention.

The above description of the method according to the invention allows a person with skill in the art to determine which devices (control devices, sensor system actuating system) are required for an autonomously controlled movement. A person with skill in the art also knows by means of which devices of the vehicle for example a communication with the mobile control device can be ensured (for example by exchanging data for starting/stopping/terminating/interrupting the autonomously controlled movement).

Similar considerations apply with regard to the features of the mobile control device (camera device, optionally display device, communication possibilities with the vehicle etc.)

Also with regard to the analysis device, a person with skill in the art knows what is required or appropriate. Similar considerations apply for the computer programs executed on the analysis device.

As far as a selection, recognition, and tracking of one or more objects in the detected images is required or is carried out in the present invention, many appropriate currently available solutions or solutions that may be available in the future (methods/devices) can be used.

The following is a typical example of carrying out the method according to the invention.

An operator (driver) is looking for a parking lot, has detected a parking lot, and the size and suitability of the parking lot is measured and determined by the sensor system of the vehicle to be at least sufficient. The operator (driver) stops the vehicle in the vicinity of the parking lot and leaves the vehicle.

In order to initiate or carry out the autonomously controlled parking procedure, the operator sends a signal per radio or by means of a handheld transmitter (which can for example be located in the ignition key) and/or the mobile control device, to the vehicle for starting the autonomously controlled parking procedure. Such a signal can for example be triggered by means of pushing a button of the mobile control device, by pushing an icon displayed on the mobile control device or by means of a voice command.

At the same time or shortly thereafter, the camera device of the mobile control device (smartphone) begins to record images in temporal sequence. These images are analyzed for example by an analysis device in the mobile control device. When the vehicle can be recognized (in sufficient quality) on the images and the further criteria for starting or continuing the autonomously controlled parking procedure are satisfied, a corresponding signal is sent from the mobile control device per radio to a corresponding device of the vehicle.

Subsequent thereto, the vehicle begins the autonomously controlled parking procedure. During the duration of the parking procedure, images taken by the camera device are continued to be analyzed by the mobile control device. When the criteria for continuing the autonomously controlled parking procedure are satisfied, the vehicle continues with the autonomous parking procedure. When the criteria for continuing the autonomous parking procedure are no longer satisfied a signal for terminating or interrupting the autonomously control parking procedure is sent by the mobile control device to the vehicle, whereupon the vehicle terminates or interrupts the parking procedure, in particular stops its movement as fast as possible.

When the criteria for continuing the autonomous parking procedure are satisfied again, for example when the operator holds the mobile control device properly again, a signal can either automatically be sent from the mobile control device to continue the parking procedure or such a signal can be triggered by a control action of the operator.

During carrying out the autonomously controlled parking procedure, the operator also has the option to send a signal per radio by means of a handheld transmitter and/or the mobile control device to the vehicle to interrupt or terminate the autonomously controlled movement of the vehicle.

When the vehicle has reached its autonomously controlled end position, the method according to the invention can be terminated for example by transmission of a corresponding signal from the vehicle to the mobile control device. The end of the method according to the invention can be signaled to the operator by a corresponding display on the display device of the mobile control device, by a corresponding signal tone or by a corresponding voice output.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method for autonomously controlling a movement of a vehicle, comprising:
   recording images of the vehicle in temporal succession with a mobile control device held by an operator located outside the vehicle;
   determining with an analysis device at least one of a position of the vehicle in the detected images, a change of the position of the vehicle in the detected images, a proportion of a depiction of the vehicle of a total image content and a change of the proportion of the depiction of the vehicle of the total image content; and
   interrupting or terminating the autonomously controlled movement of the vehicle in response to at least one of the depiction of the vehicle not or not completely being detected by the images, the proportion of the depiction of the vehicle of the total image content lies above a predeterminable threshold value or below another predeterminable threshold value, the change of the position of the vehicle in the images lies above a predeterminable threshold value or below another predeterminable threshold value, and a degree of the change of the proportion of the depiction of the vehicle of the total image content lies above a predeterminable threshold value or below another predeterminable threshold value.

2. The method of claim 1, further comprising transmitting data relating to at least one member selected from the group consisting of an actual position of the vehicle, a starting position of the vehicle, a speed of the vehicle, a speed profile of the vehicle, a direction of the vehicle and a directional profile of the vehicle to the analysis device.

3. The method of claim 1, wherein the mobile control device is constructed as a smartphone.

4. The method of claim 1, wherein the analysis device is constructed as a calculation device and is situated in the mobile control device or in the vehicle.

5. The method of claim 1 further comprising transmitting data between the vehicle and the mobile control device by means of a wireless radio connection by using a radio standard or by using a mobile radio standard.

6. The method of claim 1, further comprising transmitting a signal per radio to the vehicle by the operator located outside the vehicle by means of a handheld transmitter and/or the mobile control device for starting the autonomously controlled movement of the vehicle.

7. The method of claim 1, further comprising transmitting a signal to the vehicle by the operator located outside the vehicle by means of a handheld transmitter and/or the mobile control device to interrupt or terminate the autonomously controlled movement of the vehicle.

8. The method of claim 1, wherein the autonomously controlled movement includes at least one of an autonomous parking procedure, an autonomous unparking procedure and an autonomous continuance of a drive of the vehicle.

9. The method of claim 1, wherein the image that have been recorded in temporal succession by the camera device of the mobile control device are displayed in real time on a display device of the mobile control device.

10. A system for operating a vehicle, comprising:
 a vehicle; and
 a mobile control device, said vehicle and said mobile control device being configured for implementing the method of claim 1.

* * * * *